(No Model.) 2 Sheets—Sheet 1.

F. J. GUTMANN & G. & C. P. JOHNSON.
ICE CUTTING MACHINE.

No. 455,323. Patented July 7, 1891.

(No Model.) 2 Sheets—Sheet 2.
F. J. GUTMANN & G. & C. P. JOHNSON.
ICE CUTTING MACHINE.
No. 455,323. Patented July 7, 1891.
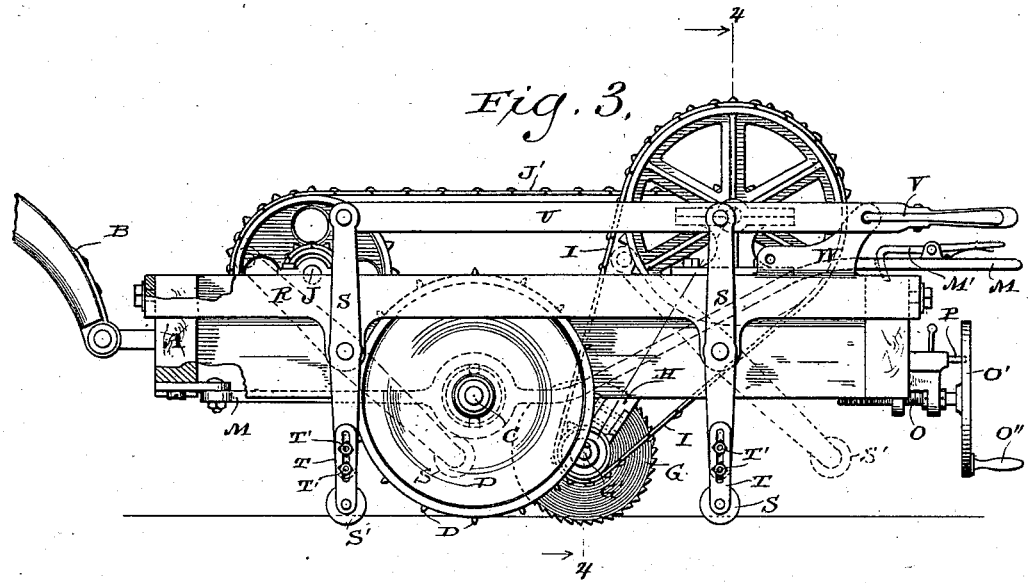
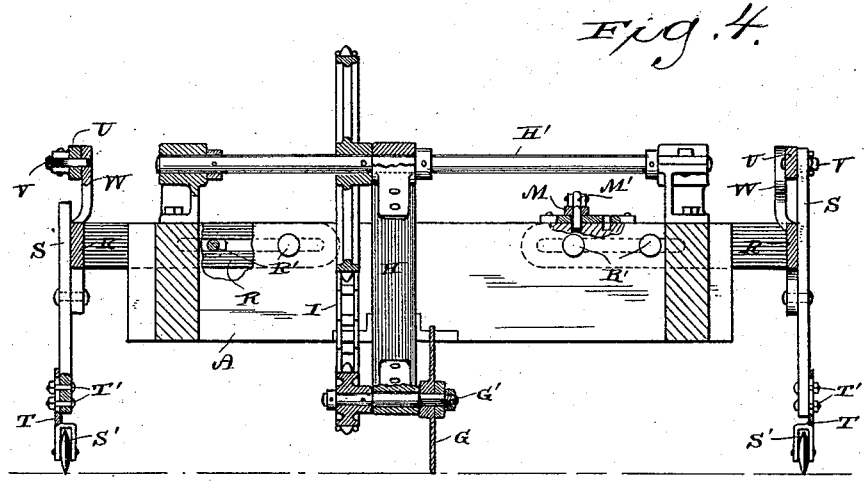
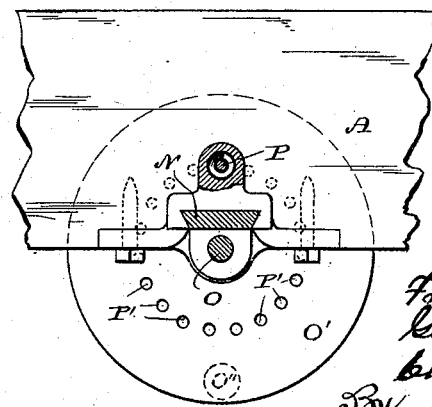
Witnesses
Geo. W. Lowry
Anna Faust
Inventors
Frank J. Gutmann
Gustav Johnson
Charles P. Johnson
By C. T. Benedict
Attorney

UNITED STATES PATENT OFFICE.

FRANK J. GUTMANN AND GUSTAV JOHNSON, OF MILWAUKEE, WISCONSIN, AND CHARLES P. JOHNSON, OF ST. CHARLES, ILLINOIS.

ICE-CUTTING MACHINE.

SPECIFICATION forming part of Letters Patent No. 455,323, dated July 7, 1891.

Application filed August 11, 1890. Serial No. 361,654. (No model.)

*To all whom it may concern:*

Be it known that we, FRANK J. GUTMANN and GUSTAV JOHNSON, of Milwaukee, county of Milwaukee, and State of Wisconsin, and CHARLES P. JOHNSON, of St. Charles, in the county of Kane and State of Illinois, have invented a new and useful Improvement in Ice-Cutting Machines, of which the following is a description, reference being had to the accompanying drawings, which are a part of this specification.

Our invention relates to a device adapted for cutting ice formed on the surface of water and is arranged to be drawn by a horse, the forward movement of the machine being utilized to operate the cutting mechanism.

Figure 1:
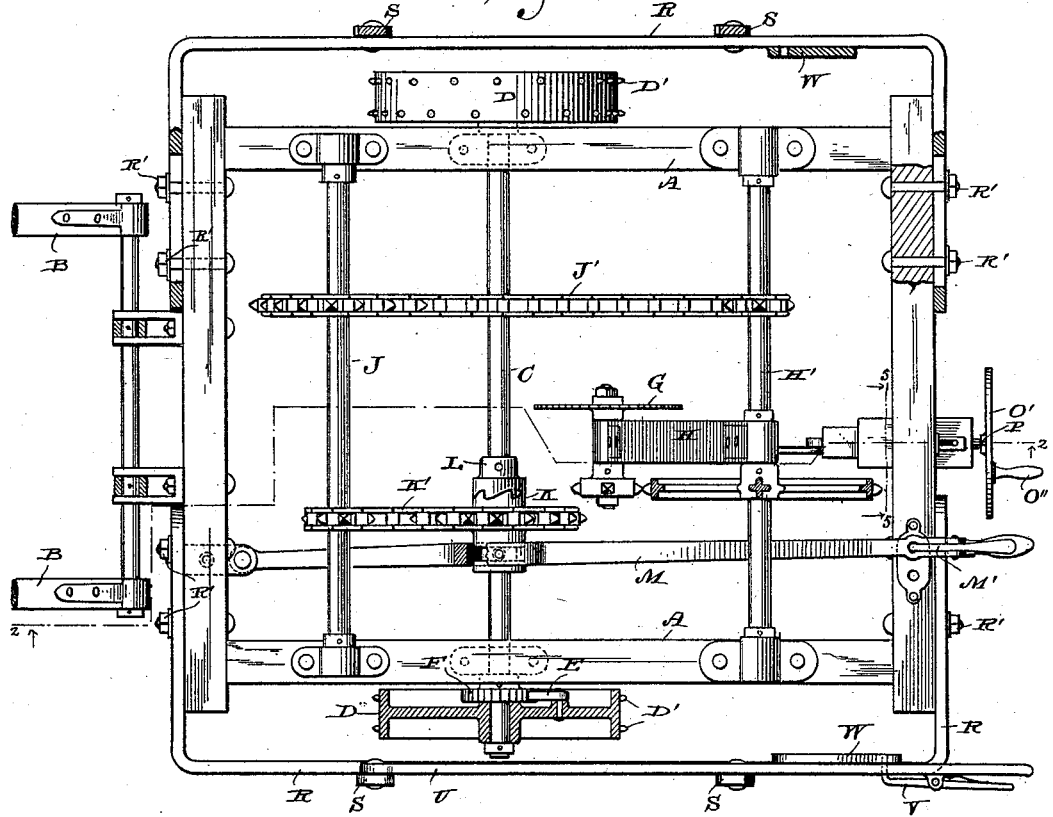
Figure 2:
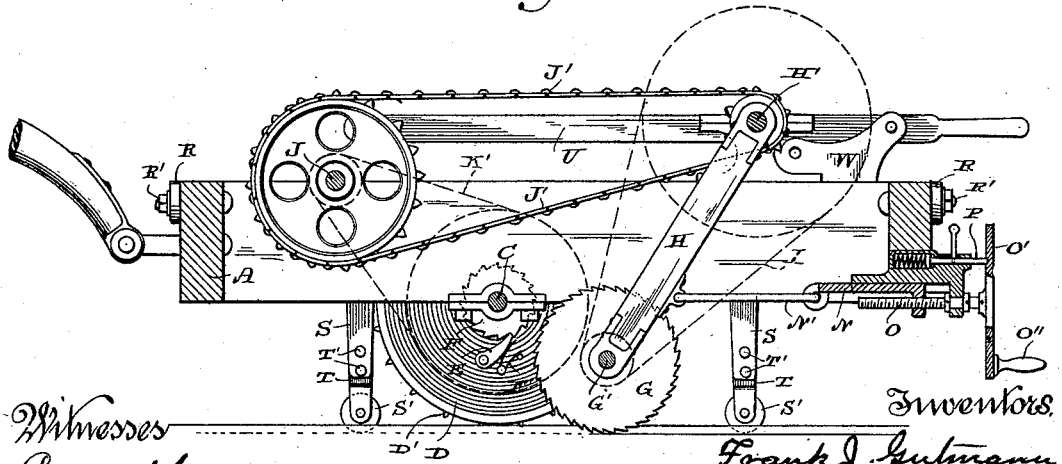

In the drawings, Figure 1 is a top plan view of the complete device, parts being broken away and shown in section to exhibit interior construction. Fig. 2 is a longitudinal vertical section on line 2 2 of Fig. 1. Fig. 3 is a side elevation of the complete device, parts being broken away to show interior construction. Fig. 4 is a transverse section of the machine on line 4 4 of Fig. 3. Fig. 5 is an inside elevation of the hand-wheel and related mechanism used for elevating the saw, the view being taken on line 5 5 of Fig. 1.

A is the frame of the machine, and B are thills secured thereto for attaching the horse to the machine. The frame and mechanism thereon are supported on a shaft C, having its bearings in boxes secured to the frame, which shaft is provided with loose wheels D D, provided with pins D' D' in its periphery to insure the engagement of the wheels with the ice and prevent their slipping thereon. These wheels rotate freely on the shaft in one direction, but are prevented from rotating on the shaft in the other direction by pawls E E, pivoted on the webs of the wheels, which pawls engage in one direction with the disk-racks F F, fixed on the shaft. The pawls are held yieldingly in engagement with the racks by means of springs F' F', secured to the wheels. This construction compels the rotation of the shaft C over forwardly with the wheels when the machine is drawn ahead. A circular saw G is fixed on an arbor G', which has its bearings in a swinging arm H, pivoted on the shaft H'. A sprocket-chain I connects the shaft H' with the arbor G' mechanically through sprocket-wheels fixed on the shaft and arbor, respectively. The shaft H' is geared to the shaft J by a sprocket-chain J', running on wheels on the shafts H' and J, respectively. The shafts H' and J have their bearings in boxes therefor secured to the frame A. The shaft J is geared by sprocket-chain K' to a hub K, loose on shaft C, through sprocket-wheels on the shaft J and hub K, respectively. The hub K is arranged to clutch and engage in one direction with a block L, fixed on the shaft C, the hub and block being provided with corresponding crown cams or teeth therefor. A lever M, pivoted at one end to the frame and riding medially in a groove in the hub K, is adapted for shifting the hub on the shaft into or out of engagement with the block L. The lever M is provided with a pivoted spring-actuated pin M', passing movably through the lever and entering sockets therefor in the frame, whereby the otherwise free end of the lever M is locked in position on the frame, thereby securing the hub K in position out of or in engagement with the block L.

For raising and lowering the saw, the saw-supporting arm H is connected by a rod N' with a block N, supported and traveling toward and from the arm H in ways therefor on the frame. The block N is moved conveniently by means of the screw-threaded rod O, supported and revolving without endwise movement in the frame and turning by its screw-thread in a part of the block N. A crank-wheel O' is fixed on the rod O and is provided with a crank or wrist handle O''. The wheel O' is secured temporarily in position by a spring-actuated bolt P, movable in a part of the frame and entering sockets P' P' therefor in the inner surface of the wheel.

It will be understood from the foregoing description that our device is so constructed that as it is drawn ahead by the horse, the saw being dropped sufficiently far, will cut a groove in the ice more or less deep, as desired, and it will be seen that the machine can be run forwardly in both directions.

For the purpose of regulating and gaging the distances apart at which the several grooves shall be cut in the ice guides are secured adjustably to both sides of the frame of the machine. Guide-bars R R, placed alongside of the frame, have their inwardly-turned ends secured adjustably to and so that the guides are movable laterally on the frame by means of bolts R' R', passing through parts of the frame and through longitudinal slots therefor in the guide-bars. Thumb-nuts, instead of the square nuts shown in the drawings, or even set-screws, instead of the bolts, may be used in this place for more convenient manipulation, if desired. Tilting guide-arms S S are pivoted medially on the guide-bars R R, preferably two on each side, which guide-arms are provided at their lower extremities with thin guide-wheels S' S', journaled in blocks T T, adjustable endwise on the arms S S by means of bolts T' T', passing through the arms and through slots therefor in the blocks T T. By means of the adjustment of which the blocks T T are capable on the arms S S the wheels S' S' may be let deeply or slightly into the groove in the ice, as desired. For conveniently tilting the arms S S and raising the guide-wheels away from the ice the upper ends of the arms S S on each side are connected movably together by bar-handles U U, which are arranged to be conveniently locked to the frame by means of the spring-actuated pins V V, pivoted on the handles U U, which pins are adapted to enter sockets therefor in brackets W W, fixed on the frame. When a groove has been cut by the saw in the ice in one direction, the machine is turned and run in the other direction, the guide-wheels S' S' being let down, so as to run in the groove already cut, and thus gage and regulate the distance of the groove being cut from the groove already made.

What we claim as new, and desire to secure by Letters Patent, is—

1. The combination, in an ice-cutting machine, with a swinging arm and the circular saw supported thereon and connected mechanically to the driving mechanism, of a block N, movable in ways in the frame and connected by a rod to the swinging saw-carrying arm, screw-threaded rod O, arranged to adjust the block N, hand-wheel O', fixed on the rod O, and locking-bolt P, adapted to lock the hand-wheel in position, substantially as described.

2. In an ice-cutting machine, the combination, with a frame supported on traction-wheels, of guide-bars located along near the sides of the frame, the ends of which bars turn inwardly alongside the ends of the frame and are adjustable laterally thereon, and tilting guide-arms pivoted on and pendent from the guide-bars and provided with thin wheels in their free ends, substantially as described.

In testimony whereof we affix our signatures in presence of two witnesses.

FRANK J. GUTMANN.
GUSTAV JOHNSON.
CHARLES P. JOHNSON.

Witnesses to the signatures of Frank J. Gutman and Gustav Johnson:
C. T. BENEDICT,
ANNA FAUST.

Witnesses to the signature of Charles P. Johnson:
T. E. RYAN,
FRANK WINQUIST.